(12) United States Patent  
Kingsley et al.

(10) Patent No.: US 8,952,341 B2  
(45) Date of Patent: Feb. 10, 2015

(54) LOW RARE EARTH MINERAL PHOTOLUMINESCENT COMPOSITIONS AND STRUCTURES FOR GENERATING LONG-PERSISTENT LUMINESCENCE

(75) Inventors: Edward D. Kingsley, Stow, MA (US); Satish Agrawal, Concord, MA (US)

(73) Assignee: Performance Indictor, LLC, Lowell, MA (US)

(*) Notice: Subject to any disclaimer, the term of this patent is extended or adjusted under 35 U.S.C. 154(b) by 350 days.

(21) Appl. No.: 13/604,699

(22) Filed: Sep. 6, 2012

(65) Prior Publication Data

US 2014/0061504 A1    Mar. 6, 2014

(51) Int. Cl.  
*G01J 1/58* (2006.01)  
*G01N 21/64* (2006.01)  
*C09K 11/08* (2006.01)

(52) U.S. Cl.  
USPC ............... 250/486.1; 250/458.1; 250/459.1; 252/301.36; 252/301.5; 252/301.4 R; 252/301.4 S; 252/301.4 P; 252/301.4 F; 252/301.4 H; 252/301.6 R; 252/301.6 S; 252/301.6 F; 252/301.6 P

(58) Field of Classification Search  
USPC ............ 250/486.1, 458.1, 459.1; 252/301.36, 252/301.5, 301.4 R, 301.4 S, 301.4 P, 252/301.4 F, 301.4 H, 301.6 R, 301.6 S, 252/301.6 F, 301.6 P  
See application file for complete search history.

(56) References Cited

U.S. PATENT DOCUMENTS

| | | |
|---|---|---|
| 3,595,804 A | 7/1971 | Martin |
| 5,424,006 A | 6/1995 | Murayama et al. |
| 6,093,346 A | 7/2000 | Xiao et al. |
| 6,117,362 A | 9/2000 | Yen et al. |
| 6,207,077 B1 | 3/2001 | Burnell-Jones |
| 7,459,204 B2 | 12/2008 | Hebrink et al. |
| 8,163,201 B2 | 4/2012 | Agrawal et al. |
| 2011/0095232 A1* | 4/2011 | Mahany .................. 252/301.36 |
| 2012/0021251 A1 | 1/2012 | Agrawal et al. |
| 2012/0027930 A1 | 2/2012 | Agrawal et al. |
| 2012/0028054 A1 | 2/2012 | Agrawal et al. |
| 2013/0320263 A1* | 12/2013 | Riman et al. ............. 252/301.36 |

* cited by examiner

*Primary Examiner* — David Porta  
*Assistant Examiner* — Mindy Vu  
(74) *Attorney, Agent, or Firm* — Cantor Colburn LLP

(57) ABSTRACT

A low rare earth mineral photoluminescent structure for generating long-persistent luminescence that utilizes at least a phosphorescent layer comprising one or more phosphorescent materials having substantially low rare earth mineral content of less than about 2.0 weight percent, and one or more fluorescent layers is disclosed. Further disclosed are methods for fabricating and using the inventive low rare earth mineral photoluminescent structure. A low rare earth mineral photoluminescent composition for generating long-persistent luminescence that utilizes at least one or more phosphorescent materials having substantially low rare earth mineral content of less than about 2.0 weight percent and one or more fluorescent materials is also disclosed, as well as, the methods for fabricating and using the inventive low rare earth mineral photoluminescent composition.

51 Claims, 7 Drawing Sheets

LOW RARE EARTH MINERAL PHOTOLUMINESCENT COMPOSITIONS AND STRUCTURES FOR GENERATING LONG-PERSISTENT LUMINESCENCE

BACKGROUND OF THE INVENTION

These teachings relate generally to photoluminescent compositions or structures, and more particularly, to the preparation and use of photoluminescent compositions or structures that utilize phosphorescent material(s) having low rare earth mineral content in combination with fluorescent material(s) to generate long-persistent luminescence, that is, for extended durations at desired emissive wavelengths.

Luminescence is the emission of electronic radiation from a molecule in its electronically excited state. The source, generally referred to as the excitation source, used to bring a molecule to its electronically excited state, indicates the type of luminescence produced. For example, the emission of electronic radiation from a molecule that is excited, i.e. in an electronically excited state, by electromagnetic radiation is referred to as "photoluminescence." The persistence of luminescence, also referred to as afterglow, depends on a number of factors, such as, but not limited to, the electronic structure, including the absorption and emission spectra of the emission centers, depths of trapping centers, and possible existence of various quenching centers or defects, the radiation spectrum of the excitation source, as well as environmental conditions, especially that of ambient temperature.

In the past metal sulfide pigments were utilized in an attempt to arrive at phosphor materials that exhibited long-persistent luminescence, e.g., U.S. Pat. Nos. 3,595,804 and 6,207,077, in which the metal is substituted and activation occurs via various elemental activators, co-activators, or compensators. Examples of common activators that were used include copper, aluminum, silver, gold, manganese, gallium, indium, scandium, lead, cerium, terbium, europium, gadolinium, samarium, praseodymium, and other rare-earth elements and halogens. These activators are believed to enter the crystal lattice of the host material and are responsible for imparting luminescent properties to such host material.

As a result, various metal sulfide pigments, such as, CaS:Bi,Tm, which emits violet blue light; CaSrS:Bi,Tm, which emits blue light; ZnS:Cu,Co, which emits green light; and ZnCdS:Cu,Co, which emits yellow or orange light, were exploited in an effort to generate long-persistent luminescence under various conditions. Unfortunately, such metal sulfide photoluminescent phosphors were shown to be environmentally unstable and exhibited photolytic instability. In addition, these phosphors displayed rather quick decaying luminescence, thus indicative of only modest persistence, i.e., less than a half hour after the cessation of the excitation source. Consequently, such metal sulfide pigments have been limited to indoor applications, as well as applications that do not require luminescence for prolonged periods of time.

As an alternative to metal sulfide pigments, a second generation of persistent phosphors, that is, alkaline earth aluminates were developed. The luminescence of these second generation persistent phosphors is found to be much brighter and much longer in duration than that of the metal sulfide pigments. Among them, the green aluminate phosphor, $SrAl_2O_4:Eu^{2+},Dy^{3+}$, is the most commonly utilized due to its emission wavelength, 520 nm, which correlates to the peak of sensitivity of human photopic vision. However, the green aluminate phosphor contains a substantial amount of rare earth minerals, which require excavation and purification that create pollution and environmental problems. It is this reliance on substantial amounts of rare earth minerals that results in the cost of such phosphor to be highly unstable and dependent on uncontrollable factors. In addition, as a result of its host material, such phosphor is shown to be unstable in the presence of water, as well as in high humidity environments.

Given the current phosphors utilized to generate long-persistent luminescence, there is, therefore, a need to utilize more cost efficient phosphors to generate long-persistent luminescence without requiring high amounts of rare earth minerals. It is also desirable, to combine such phosphors with fluorescent materials either in a composition or each in individual layers of a structure such that a wide color gamut of long-persistent luminescence may be realized. Furthermore, it is also desirable, for such phosphors to have the ability to produce long-persistent luminescence under various conditions, such as in the presence of water, without sacrificing emission intensity.

BRIEF SUMMARY OF THE INVENTION

The present teachings provide for a low rare earth mineral photoluminescent structure for generating long-persistent luminescence. The low rare earth mineral photoluminescent structure comprises a phosphorescent layer which substantially converts at least a portion of incident electromagnetic radiation to a primary emission being of long-persistent luminescence. The phosphorescent layer comprises one or more phosphorescent materials having substantially low rare earth mineral content of less than about 2.0 weight percent with an absorption spectrum that at least partially overlaps with incident electromagnetic radiation. The low rare earth mineral photoluminescent structure further comprises one or more fluorescent layers having an absorption spectrum that overlaps with at least a portion of the primary emission, such that, the one or more fluorescent layers wholly or partially convert at least the primary emission to a secondary emission being of long-persistent luminescence. In some constructions, the phosphorescent layer may also comprise one or more other phosphorescent materials having an absorption spectrum that at least partially overlaps with at least one of incident electromagnetic radiation, the emission spectrum of the one or more phosphorescent materials, or the secondary emission. In addition, the one or more other phosphorescent materials may also have an emission spectrum that at least partially overlaps with the absorption spectrum of the one or more phosphorescent materials. In one aspect of the present teachings, the phosphorescent layer may be disposed over the one or more fluorescent layers, such that a surface of the phosphorescent layer is exposed to incident electromagnetic radiation. In this aspect phosphorescent layer may also provide at least one of mechanical, chemical, or photolytic stability to the one or more fluorescent layers. In a further construction, another one or more fluorescent layers may additionally be overlaid onto the phosphorescent layer, such that a surface of one of the another one or more fluorescent layers is exposed to incident electromagnetic radiation. In an alternative aspect of the present teachings, the one or more fluorescent layers may be disposed over the phosphorescent layer, such that a surface of one of the one or more fluorescent layers is exposed to incident electromagnetic radiation. The low rare earth mineral photoluminescent structure of the present teachings may also comprise a substrate that provides base support for the low rare earth mineral photoluminescent structure. The low rare earth mineral photoluminescent structure of the present teachings may additionally comprise a UV layer that substantially enhances the stability of the one or more fluorescent layers through absorption of at least a portion of incident ultraviolet electromagnetic radiation. In an alternative aspect, the phosphorescent layer may further comprise one or more UV absorbers that substantially enhance the stability of said one or more fluorescent layers through absorption of at least a portion of incident ultraviolet electromagnetic radiation. The low rare earth mineral photoluminescent structure of the present teachings may also comprise a reflection layer that redirects at least a portion of radiation emitted in at least one of the phosphorescent layer or the one or more fluorescent layers. The reflection layer may additionally function as a substrate that provides base support for the low rare earth mineral photoluminescent structure. In another aspect, the low rare earth mineral photoluminescent structure may further comprise a protective layer that provides at least one of mechanical, chemical, or photolytic durability to the low rare earth mineral photoluminescent structure.

The present teachings also provide for a method for fabricating a low rare earth mineral photoluminescent structure for generating long-persistent luminescence. The method of the present teachings comprises forming a phosphorescent layer that substantially converts at least a portion of incident electromagnetic radiation to a primary emission being of long-persistent luminescence. The phosphorescent layer comprises one or more phosphorescent materials having substantially low rare earth mineral content of less than about 2.0 weight percent with an absorption spectrum that at least partially overlaps with incident electromagnetic radiation. The method of the present teachings further comprises forming one or more fluorescent layers having an absorption spectrum that overlaps with at least a portion of the primary emission, such that, the one or more fluorescent layers wholly or partially convert at least the primary emission to a secondary emission being of long-persistent luminescence. In some constructions, the phosphorescent layer may also comprise one or more other phosphorescent materials having an absorption spectrum that at least partially overlaps with at least one of incident electromagnetic radiation, the emission spectrum of the one or more phosphorescent materials, or the secondary emission. In addition, the one or more other phosphorescent materials may also have an emission spectrum that at least partially overlaps with the absorption spectrum of the one or more phosphorescent materials. The method of the present teachings may further comprise disposing the phosphorescent layer over the one or more fluorescent layers, such that a surface of the phosphorescent layer is exposed to incident electromagnetic radiation. In an additionally aspect, the method of the present teachings may then further comprise overlaying another one or more fluorescent layers onto the phosphorescent layer, such that a surface of one of the another one or more fluorescent layers is exposed to incident electromagnetic radiation. In an alternative aspect, the method of the present teachings may additionally comprise disposing the one or more fluorescent layers onto the phosphorescent layer, such that a surface of one of the one or more fluorescent layers is exposed to incident electromagnetic radiation. In another aspect, the method may also comprise rendering the phosphorescent layer or one of the one or more fluorescent layers onto or into a substrate that provides base support for the low rare earth mineral photoluminescent structure. The method of the present teachings may further comprise incorporating one or more UV absorbers into the phosphorescent layer, wherein the one or more UV absorbers substantially enhance the stability of the one or more fluorescent layers through absorption of at least a portion of incident ultraviolet electromagnetic radiation. In an alternative aspect, the method may also comprise overlaying a UV layer onto a surface of one of the phosphorescent layer or one of the one or more fluorescent layers, wherein the UV layer substantially enhances the stability of the one or more fluorescent layers. In another aspect, the method of the present teachings may further comprise applying a reflection layer disposed over a surface of one of the phosphorescent layer or one of the one or more fluorescent layers, the surface not having another layer disposed on the surface, wherein the reflection layer redirects at least a portion of radiation emitted in at least one of the phosphorescent layer or the one or more fluorescent layers. In yet another aspect, the method of the present teachings may additionally comprise rendering a protective layer over a surface of one of the phosphorescent layer or one of the one or more fluorescent layers, the surface not having another layer disposed on the surface, wherein the protective layer provides at least one of mechanical, chemical, or photolytic durability to the low rare earth mineral photoluminescent structure.

The present teachings further provide for a method for generating long-persistent luminescence. The method comprises providing a low rare earth mineral photoluminescent structure that comprises a phosphorescent layer and one or more fluorescent layers. The phosphorescent layer comprises one or more phosphorescent materials having substantially low rare earth mineral content of less than about 2.0 weight percent with an absorption spectrum that at least partially overlaps with incident electromagnetic radiation, whereas the one or more fluorescent layers have an absorption spectrum that overlaps with at least a portion of a primary emission. The low rare earth mineral photoluminescent structure is subsequently exposed to incident electromagnetic radiation and the phosphorescent layer substantially converts at least a portion of incident electromagnetic radiation to the primary emission being of long-persistent luminescence, and the one or more fluorescent layers wholly or partially convert at least the primary emission to a secondary emission being of long-persistent luminescence. The phosphorescent layer may further comprise one or more other phosphorescent materials having an absorption spectrum that at least partially overlaps with at least one of incident electromagnetic radiation, the emission spectrum of the one or more phosphorescent materials, or the secondary emission. In addition, the one or more other phosphorescent materials may also have an emission spectrum that at least partially overlaps with the absorption spectrum of the one or more phosphorescent materials. The low rare earth mineral photoluminescent structure may also comprise a substrate that provides base support for the low rare earth mineral photoluminescent structure. The phosphorescent layer may additionally comprise one or more UV absorbers that substantially enhance the stability of the one or more fluorescent layers through absorption of at least a portion of incident ultraviolet electromagnetic radiation. The low rare earth mineral photoluminescent structure may further comprise a UV layer that substantially enhances the stability of the one or more fluorescent layers through absorption of at least a portion of incident ultraviolet electromagnetic radiation. The low rare earth mineral photoluminescent structure may also comprise a reflection layer that redirects at least a portion of radiation emitted in at least one of the phosphorescent layer or the one or more fluorescent layers. The low rare earth mineral photoluminescent structure may further comprise a protective layer that provides at least one of mechanical, chemical, or photolytic durability to the low rare earth mineral photoluminescent structure.

The present teachings further provide for a low rare earth mineral photoluminescent composition for generating long-persistent luminescence. The low rare earth mineral photoluminescent composition comprises one or more phosphorescent materials that substantially convert at least a portion of incident electromagnetic radiation to a primary emission being of long-persistent luminescence. The one or more phosphorescent materials of the present teachings have substantially low rare earth mineral content of less than about 2.0 weight percent with an absorption spectrum that at least partially overlaps with incident electromagnetic radiation. The low rare earth mineral photoluminescent composition also comprises one or more fluorescent materials having an absorption spectrum that overlaps with at least a portion of the primary emission, such that the one or more fluorescent materials wholly or partially convert at least the primary emission to a secondary emission being of long-persistent luminescence. In addition, the one or more phosphorescent materials also substantially enhance the stability of the one or more fluorescent materials. In one aspect, the low rare earth mineral photoluminescent composition may further comprise one or more other phosphorescent materials having an absorption spectrum that at least partially overlaps with at least one of incident electromagnetic radiation, the emission spectrum of the one or more phosphorescent materials, or the secondary emission. In addition, the one or more other phosphorescent materials may also have an emission spectrum that at least partially overlaps with the absorption spectrum of the one or more phosphorescent materials. The low rare earth mineral photoluminescent composition may be disposed into or onto a substrate that provides base support for the low rare earth mineral photoluminescent composition. In an alternative aspect, the low rare earth mineral photoluminescent composition may be disposed onto a reflection layer that redirects at least a portion of radiation emitted in said low rare earth mineral photoluminescent composition. In certain constructions, the reflection layer may additionally function as a substrate that provides base support for the low rare earth mineral photoluminescent composition. The low rare earth mineral photoluminescent composition of the present teachings may also comprise one or more UV absorbers that further substantially enhance the stability of the one or more fluorescent materials through absorption of at least a portion of incident ultraviolet electromagnetic radiation. In other constructions, the low rare earth mineral photoluminescent composition may be disposed onto a surface of one or more fluorescent layers, such that a longer emissive wavelength is produced.

The present teachings also provide for a method for fabricating a composition for generating long-persistent luminescence. The method comprises incorporating one or more phosphorescent materials having substantially low rare earth mineral content of less than about 2.0 weight percent with an absorption spectrum that at least partially overlaps with incident electromagnetic radiation, and one or more fluorescent materials having an absorption spectrum that overlaps with at least a portion of a primary emission into the composition, the composition being a low rare earth mineral photoluminescent composition. The low rare earth mineral photoluminescent composition, when subsequently exposed to incident electromagnetic radiation, enables the one or more phosphorescent materials to substantially convert at least a portion of incident electromagnetic radiation to the primary emission being of long-persistent luminescence, and the one or more fluorescent materials to wholly or partially convert at least the primary emission to a secondary emission being of long-persistent luminescence. In addition, the one or more phosphorescent materials also substantially enhance the stability of the one or more fluorescent materials. In one aspect, the method of the present teachings may further comprise incorporating one or more other phosphorescent materials into the low rare earth mineral photoluminescent composition, wherein the one or more other phosphorescent materials having an absorption spectrum that at least partially overlaps with at least one of incident electromagnetic radiation, the emission spectrum of the one or more phosphorescent materials, or the secondary emission. In addition, the one or more other phosphorescent materials may also have an emission spectrum that at least partially overlaps with the absorption spectrum of the one or more phosphorescent materials. In yet another aspect, the method of the present teachings may also comprise depositing one or more UV absorbers into the low rare earth mineral photoluminescent composition, wherein the one or more UV absorbers further substantially enhance the stability of the one or more fluorescent materials through absorption of at least a portion of incident ultraviolet electromagnetic radiation.

The present teachings further provide for a method for generating long-persistent luminescence. The method comprises providing a low rare earth mineral photoluminescent composition that comprises one or more phosphorescent materials having substantially low rare earth mineral content of less than about 2.0 weight percent with an absorption spectrum that at least partially overlaps with incident electromagnetic radiation, as well as one or more fluorescent materials having an absorption spectrum that overlaps with at least a portion of a primary emission. The low rare earth mineral photoluminescent composition is subsequently exposed to incident electromagnetic radiation, and the one or more phosphorescent materials substantially convert at least a portion of incident electromagnetic radiation to the primary emission being of long-persistent luminescence, and the one or more fluorescent materials wholly or partially convert at least the primary emission to a secondary emission being of long-persistent luminescence. In addition, the one or more phosphorescent materials substantially enhance the stability of the one or more fluorescent materials. The low rare earth mineral photoluminescent composition may further comprise one or more other phosphorescent materials having an absorption spectrum that at least partially overlaps with at least one of incident electromagnetic radiation, the emission spectrum of the one or more phosphorescent materials, or the secondary emission. In addition, the one or more other phosphorescent materials may also have an emission spectrum that at least partially overlaps with the absorption spectrum of the one or more phosphorescent materials. The low rare earth mineral photoluminescent composition may also comprise one or more UV absorbers that further substantially enhances the stability of the one or more fluorescent materials through absorption of at least a portion of incident ultraviolet electromagnetic radiation. In one aspect, the method of the present teachings may further comprise depositing the low rare earth mineral photoluminescent composition onto or into a substrate that provides support for the low rare earth mineral photoluminescent composition. In another aspect, the method of the present teachings may also comprise depositing the low rare earth mineral photoluminescent composition onto a reflection layer that redirects at least a portion of radiation emitted in the low rare earth mineral photoluminescent composition. In an alternative aspect, the method of the present teachings may also comprise depositing the low rare earth mineral photoluminescent composition onto a surface of one or more fluorescent layers, such that a longer emissive wavelength is produced.

BRIEF DESCRIPTION OF THE DRAWINGS

The present teachings are illustratively shown and described in reference to the accompanying drawings, in which.

DETAILED DESCRIPTION OF THE INVENTION

Figure 1:
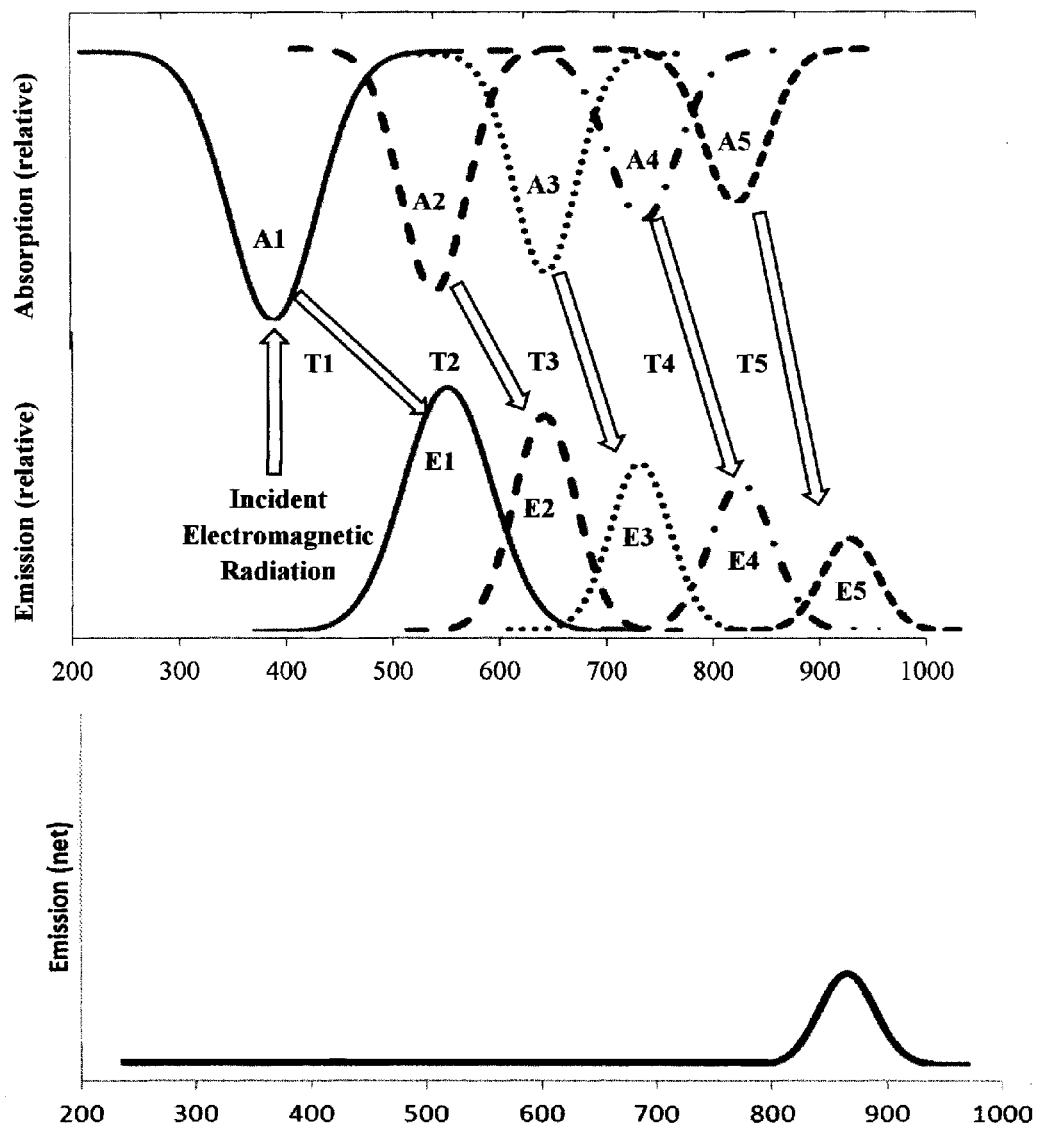
FIG. 1 is a schematic that describes the cascade of emission from one photoluminescent material to another.

The present teachings are directed to the creation and use of stable, low rare earth mineral photoluminescent composition(s) or structure(s) that generate long-persistent luminescence with the use of at least one or more phosphorescent materials having substantially low rare earth mineral content and one or more fluorescent materials.

For a better understanding of the disclosure, the following terms are herein defined:

"Luminescence" as used herein refers to the emission of electromagnetic radiation from any substance. Luminescence occurs from electronically excited states following excitation of the ground state of the substance by an energy source.

The electronic excited states of most organic molecules can be divided into singlet states and triplet states.

As used herein, the term "singlet state" refers to an electronic state wherein all electrons in the molecule are spin-paired.

As used herein, the term "triplet state" refers to an electronic state wherein one set of electron spins is unpaired.

The excited state is usually the first excited state. A molecule in a high vibrational level of the excited state will quickly fall to the lowest vibrational level of this state by losing energy to other molecules through collision. The molecule will also partition the excess energy to other possible modes of vibration and rotation.

"Long-Persistent Luminescence" is emission of electromagnetic radiation at desired wavelengths for prolonged periods of time, after cessation of irradiation.

"Luminescent materials" are those which exhibit luminescence, that is, emit electromagnetic radiation. Characterizing luminescent materials requires consideration of: (1) the excitation source, (2) the nature of the emission, and (3) whether or not additional stimulation is required to cause emission.

With regard to the excitation source, luminescent materials excited by electromagnetic radiation are referred to herein as "photoluminescent." Luminescent materials excited by electrical energy are referred to herein as "electroluminescent." Luminescent materials excited by a chemical reaction are referred to herein as "chemiluminescent."

With regard to the nature of the emission, this may be either fluorescence or phosphorescence. A "fluorescent" material stores electromagnetic radiation and releases it rapidly, generally in about $10^{-8}$ seconds or less, in a process that does not invoke a change in the electronic spin state of the molecule. Fluorescence from organic molecules typically occurs from excited singlet states. Contrarily, a "phosphorescent" material stores electromagnetic radiation and releases it gradually, in about $10^{-6}$ seconds or greater, in a process that requires a change in the electronic spin state of the molecule.

As used herein, "ultraviolet electromagnetic radiation" is characterized by electromagnetic radiation with wavelengths in the region less than about 400 nanometers ("nm").

As used herein, "visible electromagnetic radiation" is characterized by electromagnetic radiation with wavelengths in the region between about 400 nanometers ("nm") and about 700 nanometers ("nm").

As used herein, "infrared electromagnetic radiation" is characterized by electromagnetic radiation with wavelengths in the region greater than about 700 nanometers ("nm").

"Incident Electromagnetic Radiation" as used herein refers to any energy source natural and/or artificial, radiating within the surrounding environment. The emission spectrum of incident electromagnetic radiation may lie within the infrared, visible, and/or ultraviolet spectrum.

"Primary Emission" as used herein refers to the emission spectrum of one or more phosphorescent materials, as defined above. The nature of the primary emission may be infrared, visible, and/or ultraviolet electromagnetic radiation.

"Secondary Emission" as used herein refers to the emission spectrum of one or more fluorescent materials, as defined above. The nature of the secondary emission may be infrared, visible, and/or ultraviolet electromagnetic radiation.

"Low Rare Earth Mineral Content" as used herein refers to an amount of low rare earth minerals of less than about 2.0 weight percent (wt %) of the total amount of a phosphorescent material.

A "composition" as used herein is a medium, that comprises at least one or more polymeric resins that act as a carrier for one or more materials that may be distributed in a solid state and/or dissolved therein.

A "photoluminescent composition" is a composition, as defined above, which further comprises one or more phosphorescent materials and/or one or more fluorescent materials.

A "layer" as used herein refers to a thin film resulting from the application and substantial drying of one or more polymeric resins and/or one or more materials that are substantially dissolved therein, or in some instances by way of extrusion, injection molding, etc.

A "phosphorescent layer" is a layer, as defined above, that comprises at least one or more phosphorescent materials, as defined above, in which the one or more polymeric resins act as a carrier for the one or more phosphorescent materials. The one or more polymeric resins may additional provide other physical functionalities such as, but not limited to, flexibility of the phosphorescent layer or protection of any underlying layers.

A "fluorescent layer" is a layer, as defined above, that comprises at least one or more fluorescent materials, as defined above, in which the one or more polymeric resins are selected solely to act as a carrier for the one or more fluorescent materials and does not enable the fluorescent layer to function as a protective layer, as defined below.

A "protective layer" is a layer, as defined above, wherein the one or more polymeric resins are selected solely to provide protection against photolytic degradation and/or for providing environmental, chemical, and/or mechanical protection of the underlying layer/layers or composition.

"Photolytic degradation" is deterioration or change in properties, such as observed color or luminescence characteristics, that is induced by exposure to electromagnetic radiation.

"Viewing hemisphere" refers to the area in which the primary and secondary emissions are perceived.

Generally speaking, the low rare earth mineral photoluminescent composition(s) or structure(s), according to the present teachings, utilize at least the absorption and emission spectra of one or more phosphorescent materials having low rare earth mineral content and one or more fluorescent materials to generate long-persistent luminescence, by way of energy conversion.

One general method of energy conversion used in the present teachings is represented in FIG. 1. With reference to FIG. 1, the electromagnetic energy spectrum of incident electromagnetic radiation is converted into a new electromagnetic radiation, i.e. according to the present teachings, at least one of primary emission or secondary emission, having a spectrum generally of a higher average wavelength, through a cascade of absorption/emission events by one or more photoluminescent materials, such as phosphorescent and/or fluorescent materials. Each individual photoluminescent material is characterized by a radiation energy absorption spectrum $A_i$, a radiation energy emission spectrum $E_i$, and a characteristic time constant $T_i$ between radiation absorption and radiation emission (where i=1, 2, 3 . . . ). Preferably, some or all of the new electromagnetic radiation produced by this method is visible electromagnetic radiation.

Further referring to FIG. 1, in one aspect of this energy conversion method, the incident electromagnetic radiation that falls within the absorption spectrum of a first photoluminescent material, such as a phosphorescent material, characterized by energy absorption spectrum $A_1$, energy emission spectrum $E_1$, and a characteristic time constant $T_1$ between energy absorption and energy emission, is substantially absorbed. Generally, the average wavelength of radiation emission spectrum $E_1$ is higher than the average wavelength of radiation absorption spectrum $A_1$. This difference in wavelengths is referred to as the Stokes shift, and the energy corresponding to this difference in wavelengths is referred to as Stokes loss. The emission of the first photoluminescent material, representing a longer wavelength, that is not characteristic of the incident electromagnetic radiation, can be allowed to escape.

Still referring to FIG. 1, in another aspect of this energy conversion method, a second photoluminescent material, such as a fluorescent material, may be used to absorb at least a portion of the emission of the first photoluminescent material, that is, $E_1$. The second photoluminescent material is characterized by energy absorption spectrum $A_2$, energy emission spectrum $E_2$, and a characteristic time constant $T_2$ between energy absorption and energy emission. The second photoluminescent material emits radiation and exhibits a Stokes shift to a yet higher wavelength than the first photoluminescent material. Additional photoluminescent materials having appropriate Stokes shifts may be chosen to further convert the radiation of at least one of the first or second photoluminescent material until the desired emission wavelength is reached. These additional photoluminescent materials are characterized by radiation absorption spectra $A_3$, $A_4$, $A_5$, etc., radiation emission spectra, $E_3$, $E_4$, $E_5$, etc., and characteristic time constants between radiation absorption and radiation emission $T_3$, $T_4$, $T_5$, etc. It should be noted that in the instance where the first photoluminescent material is that of a persistent phosphor and any additional photoluminescent materials are fluorescent materials that substantially absorb the emission of the persistent phosphor, $E_1$, the time constant of the persistent phosphor, $T_1$, will control the emission of all the photoluminescent materials, causing the time constants of the additional photoluminescent materials to be dependent upon $T_1$, such that, the time constants of the additional photoluminescent materials will appear substantially equal to that of $T_1$. In this manner, incident electromagnetic radiation can be used to produce a primary emission characterized by a blue color, for example, and then further to generate green, yellow, orange, or red light.

Figure 2:
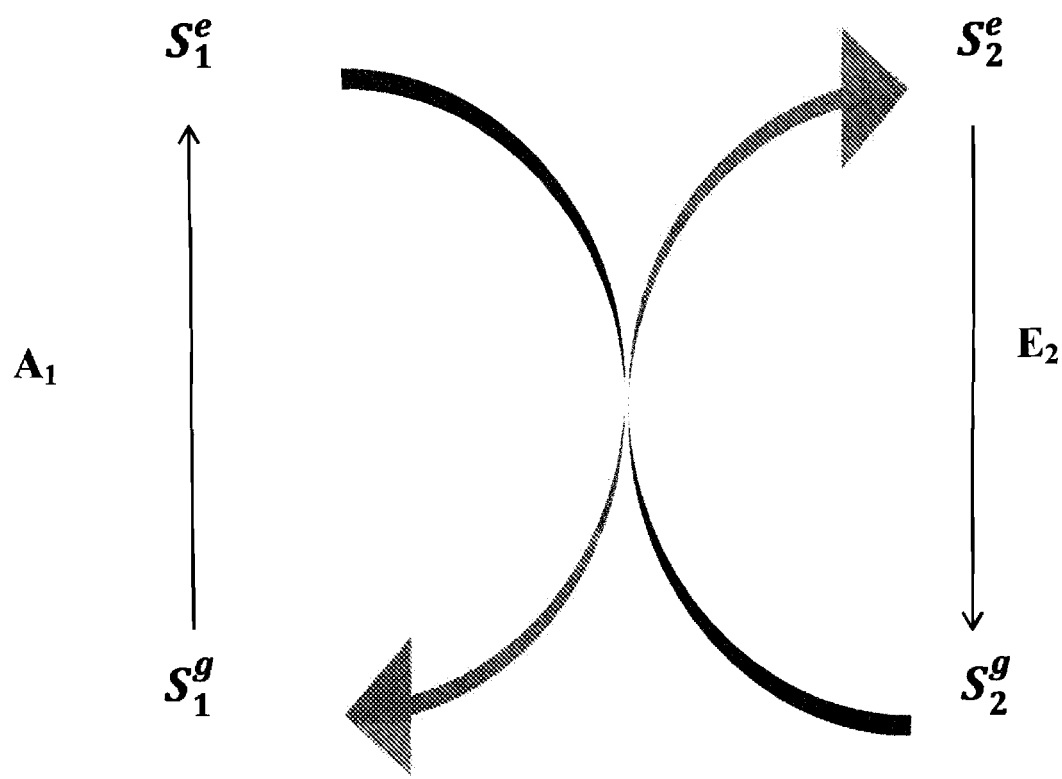
FIG. 2 is a schematic that describes the energy transfer from one photoluminescent material to another by way of Förster transfer.

While reabsorption of emitted radiation can be an effective mechanism for energy conversion, the transfer of energy does not require emission and reabsorption. Alternatively, the transfer of energy in energy conversion can occur through a Förster transfer mechanism, as illustrated in FIG. 2. With reference to FIG. 2, $S_1^g$ represents the state of a first photoluminescent material, before absorbing incident electromagnetic radiation, $S_1^e$ represents the state of the first photoluminescent material after absorption (the excited state), and $A_1$ represents the energy of the photon of incident electromagnetic radiation absorbed by the first photoluminescent material. Likewise, $S_2^g$ represents the non-excited state of a second photoluminescent material, $S_2^e$ represents the excited state of the second photoluminescent material, and $E_2$ represents the emission of radiation from the second photoluminescent material corresponding to the transition from its excited state back to its non-excited state. With continued reference to FIG. 2, the second photoluminescent material can be excited from $S_2^g$ to $S_2^e$ by transfer of energy from $S_1^e$ without the emission of radiation from the first photoluminescent material. As a result, the emission $E_2$ is produced from direct excitation of the first photoluminescent material. Förster transfer can occur where the electronic characteristics of the emission of a first photoluminescent material and the absorption of a second photoluminescent material are properly chosen, such that the transfer of electronic energy can occur by dipolar coupling without requiring the emission of a photon by the first photoluminescent material. Förster transfer requires that the photoluminescent materials undergoing the transfer of the electronic energy be close enough to experience their respective dipolar fields. As a result, Förster transfer requires a significantly higher concentration of the second photoluminescent material than is conventionally used for other methods of energy conversion.

In general, these present teachings provide for a low rare earth mineral photoluminescent composition or structure for generating long-persistent luminescence that utilizes at least one or more phosphorescent materials incorporated into the composition or rendered as a phosphorescent layer within the structure, having substantially low rare earth mineral content with an absorption spectrum that at least partially overlaps with incident electromagnetic radiation, and one or more fluorescent materials incorporated into the composition or rendered as one or more fluorescent layers within the structure, having an absorption spectrum that overlaps with at least a portion of a primary emission, i.e. the emitted radiation of the one or more phosphorescent materials.

Phosphorescent Materials:

The one or more phosphorescent materials used in the present invention are selected based on their absorption and emission properties, as well as their rare-earth mineral content. According to the present teachings, the one or more phosphorescent materials, incorporated into a composition or rendered as a layer, having substantially low rare earth mineral content with an absorption spectrum that at least partially overlaps with incident electromagnetic radiation is utilized to substantially convert at least a portion of incident electromagnetic radiation to a primary emission. Suitable one or more phosphorescent materials useful in the present invention include, but are not limited to, those or similar to those described in U.S. Pat. Nos. 5,424,006, 6,093,346, and 6,117,362, which are incorporated by reference herein in their entirety, as well as those with the general formula:

$$XO \cdot nAl_2O_3 \cdot mMgO \cdot pSiO_2 : xEu^{2+}, yDy^{3+}, zNd^{3+}, kR^{3+},$$

where X is Sr or Ca; n=0 to 4, m=0 to 2, p=0 to 2, x=0.0001 to 0.05, y=0.001 to 0.05, z=0 to 0.05, k=0 to 0.05; and R is at least one of Y, La, Ce, Pr, Nd, Sm, Gd, Tb, Dy, Ho, Er, Tm, Yb or Lu.

The one or more phosphorescent materials enable the present invention to generate long-persistent luminescence, that is, having an afterglow that decays substantially slower, without requiring a substantial amount of rare earths. For purposes of illustration, Table 1 below, demonstrates the persistence of a phosphorescent material having low rare earth mineral content, such as $Sr_4Al_{14}O_{25}:0.035Eu^{2+}, 0.015Dy^{3+}$ as an example, vs. another phosphorescent material such as $SrAl_2O_4:0.01Eu^{2+}, 0.02Dy^{3+}$ as an example, after exposure to electromagnetic radiation for 5 minutes at 100 FC from a Metal Halide lamp, outfitted with 150W MHC 150 metal halide light bulb.

TABLE 1

| | Persistence (mcd/m$^2$) | |
|---|---|---|
| Time (minutes) | $Sr_4Al_{14}O_{25}$: 0.035Eu$^{2+}$, 0.015Dy$^{3+}$ (Low Rare Earth Mineral Content) | $SrAl_2O_4$: 0.01Eu$^{2+}$, 0.02Dy$^{3+}$ |
| 1 | 990.8 | 1009.4 |
| 5 | 308.2 | 296.4 |
| 10 | 161.3 | 153.4 |
| 20 | 79.5 | 75.1 |
| 30 | 51.8 | 48.3 |
| 40 | 37.6 | 35.0 |
| 60 | 23.7 | 21.9 |
| 90 | 14.7 | 13.3 |
| 120 | 13.1 | 9.3 |

As is apparent from Table 1, subsequent to exposure to the same conditions, a phosphorescent material having low rare earth mineral content generates luminescence that is longer in persistence than that of another phosphorescent material.

Figure 3:
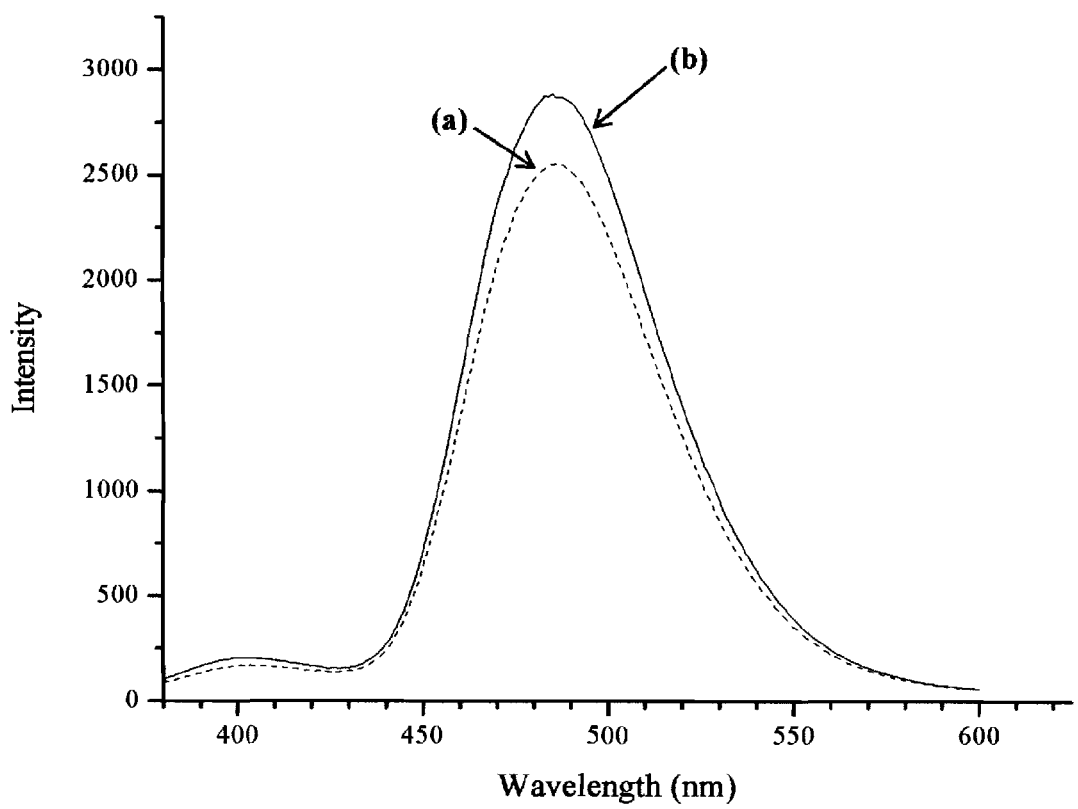
FIG. 3 is a graph illustrating the effects moisture has on the sustained stability of a phosphorescent material having substantially low rare earth content.

Furthermore, these one or more phosphorescent materials used in the present teachings provide sustained stability in varying environments, such as in a moisture atmosphere or in water. For example, FIG. 3 illustrates the emission intensity curves of untreated $Sr_4Al_{14}O_{25}$: $Eu^{2+}$, $Dy^{3+}$ (a) and treated $Sr_4Al_4O_{25}$: $Eu^{2+}$, $Dy^{3+}$ (b). The treated $Sr_4Al_{14}O_{25}$: $Eu^{2+}$, $Dy^{3+}$ was treated with a water wash. As shown in FIG. 3, the emission intensity of the treated $Sr_4Al_{14}O_{25}$: $Eu^{2+}$, $Dy^{3+}$ (b) increased by more than 10% of the emission intensity of the untreated $Sr_4Al_{14}O_{25}$: $Eu^{2+}$, $Dy^{3+}$ (a), thus demonstrating the sustained stability of the one or more phosphorescent materials of the present teachings in water. This increase in emission intensity is further indicative of the positive effect a water wash treatment has on that of one or more phosphorescent materials having low rare earth mineral content. In addition the one or more phosphorescent materials of the present teachings may also provide mechanical, chemical, and/or photolytic stability to the one or more fluorescent materials that are incorporated into the same photoluminescent composition or rendered as a separate layer within the same photoluminescent structure. For example, the one or more phosphorescent materials may provide photolytic stability through substantially absorbing at least a portion of incident electromagnetic radiation, thereby preventing exposure of the one or more fluorescent materials to such radiation.

Figure 4:
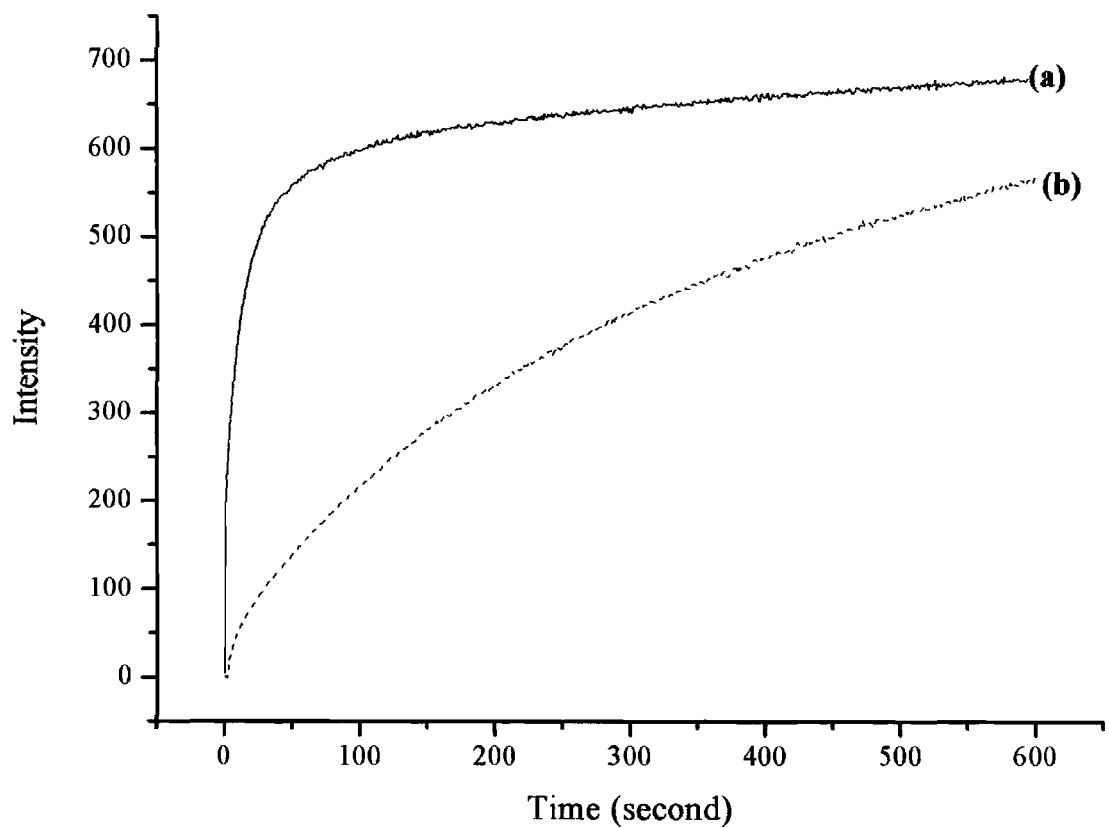
FIG. 4 is a graph that shows the effects on the absorption rates of phosphorescent materials having low rare earth mineral content when doped with additional rare earths.

It should be noted that phosphorescent materials having substantially low rare earth mineral content may exhibit a somewhat weaker absorption rate, i.e. charging rate, due to the presence of low rare earth mineral concentrations, such as $Eu^{2+}$, $Dy^{3+}$, etc. To counteract this, it may be preferred in some instances, to dope these phosphorescent materials with one or more additional rare earths, such as, yttrium, etc. For example, FIG. 4 illustrates the absorption curves of $Sr_4Al_{14}O_{25}:0.035Eu^{2+}$, $0.015Dy^{3+}$, $0.04Y^{3+}$ (a) and $Sr_4Al_{14}O_{25}:0.035Eu^{2+}$, $0.015Dy^{3+}$ (b). As is apparent from FIG. 4, doping these phosphorescent materials with one or more additional rare earths, results in a faster charging rate, as well as a brighter initial afterglow.

In another instance, it may be preferred to additionally incorporate one or more other phosphorescent materials having an absorption spectrum that at least partially overlaps with at least one of incident electromagnetic radiation, the emission spectrum of the one or more phosphorescent materials having substantially low rare earth mineral content, or the emission of the one or more fluorescent materials, that is, the secondary emission. In this instance a wider range of electromagnetic radiation may be then utilized to produce a desired primary emission of a longer wavelength that would otherwise not be able to be obtained. Furthermore, it may be preferred that the one or more other phosphorescent materials also have an emission spectrum that at least partially overlaps with the absorption spectrum of the one or more phosphorescent materials having substantially low rare earth mineral content. In this instance, the one or more other phosphorescent materials are utilized to increase the amount of energy of electromagnetic radiation available to charge, i.e. excite, the one or more phosphorescent materials having substantially low rare earth mineral content.

Fluorescent Materials:

The one or more fluorescent materials used in the present teachings are selected based on their absorption and emission properties. According to the present teachings, the one or more fluorescent materials, incorporated into the same photoluminescent composition or rendered as one or more layers within the same photoluminescent structure as that of the one or more phosphorescent materials, have an absorption spectrum that overlaps with at least a portion of the primary emission, that is, the emission of the one or more phosphorescent materials. These one or more fluorescent materials wholly or partially convert at least the primary emission to a secondary emission, i.e., a longer wavelength. In accordance with the present teachings, utilizing these one or more fluorescent materials with that of the one or more phosphorescent materials, enables a wide color gamut of long-persistent luminescence to be produced.

In accordance with the present teachings, it should be noted that it is preferred that the one or more fluorescent materials used in conjunction with that of the one or more phosphorescent materials having substantially low rare earth mineral content, should minimally interfere, if at all, with the charging of the one or more phosphorescent materials, so as not to impede these one or more phosphorescent materials absorption capabilities of the incident electromagnetic radiation. Thus, the absorption spectrum of the one or more fluorescent materials should preferentially have minimal, if any, overlap with that of the absorption spectrum of the one or more phosphorescent materials. This preference arises from the dependence of the secondary emission on that of at least a portion of the primary emission.

Suitable one or more fluorescent materials useful in the present teachings include, but are not limited to, rylenes, xanthenes, porphyrins, cyanines, violanthrones and others, preferably fluorescent materials having high quantum yield properties. Rylene dyes include, but are not limited to, perylene ester and diimide materials, such as 3-cyanoperylene-9,10-dicarboxylic acid 2',6'-diiosopropylanilide, 3,4,9,10-perylene tetracarboxylic acid bis(2,6-diisopropyl) anilide, 1,6,7,12-tetraphenoxy-N,N'-di(2,6-diisopropylphenyl)-3, 4:9, 10-perylenediimide, etc. Xanthene dyes include, but are not limited to, Rhodamine B, Eosin Y, and fluorescein. Porphyrin dyes include, for example, 5,10,15,20-tetraphenyl-21H,23H-tetraphenylporphine, 2,3,7,8,12,13,17,18-octaethyl-21H,23H-porphine, etc. Cyanine dyes include 3,3'-diethyloxadicarbocyanine iodide, 3,3'-diethyloxacarbocyanine iodide, IR 775, IR 792, etc. Violanthrones include violanthrone 78, violanthrone 79, etc.

Low Rare Earth Mineral Photoluminescent Composition Embodiments:

In one aspect, the present teachings provide for a low rare earth mineral photoluminescent composition that comprises one or more phosphorescent materials having substantially low rare earth mineral content with an absorption spectrum that at least partially overlaps with incident electromagnetic radiation and one or more fluorescent materials having an absorption spectrum that overlaps with at least a portion of the radiation emitted from the one or more phosphorescent materials, i.e. primary emission, to generate long-persistent luminescence. In addition, since the absorption spectrum of the one or more phosphorescent materials at least partially overlaps with incident electromagnetic radiation, the one or more phosphorescent materials further substantially enhance the stability of the one or more fluorescent materials. Upon exposure to incident electromagnetic radiation, the one or more phosphorescent materials absorb at least a portion of the incident electromagnetic radiation and substantially convert the absorbed radiation to a primary emission of a longer wavelength. At least a portion of the primary emission is then absorbed by the one or more fluorescent materials and substantially converted to a secondary emission of an even longer wavelength than that of the primary emission. Given that the one or more phosphorescent materials and the one or more fluorescent materials of the present teachings are characterized as isotropic Lambertian emitters, approximately 50% of unabsorbed primary emission and approximately 50% of secondary emission will propagate to the viewing hemisphere.

Figure 5:
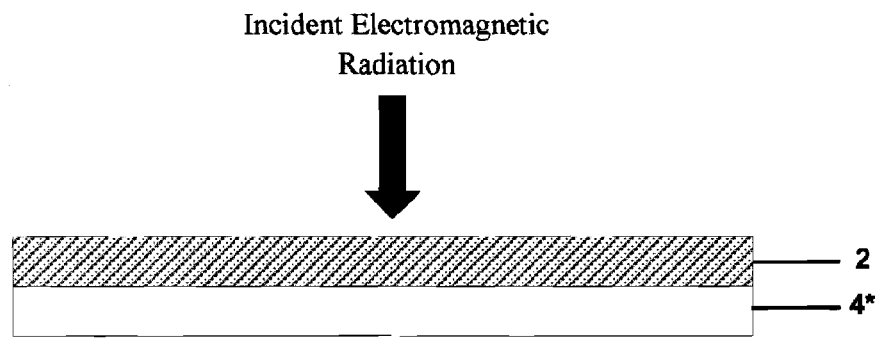
FIG. 5 is a schematic drawing of a low rare earth mineral composition according to one aspect of the present teachings, disposed on a substrate.

In another aspect of the present teachings, as illustrated in FIG. 5, the low rare earth mineral photoluminescent composition 2 may be further deposited onto or into a substrate 4* that provides base support for the composition. Suitable substrates useful in the present invention include, but are not limited to, polyesters, polyolefins, polycarbonates, and PVC films.

For the low rare earth mineral photoluminescent composition of the present teachings to efficiently generate long-persistent luminescent, the primary and secondary emission should substantially emit towards the viewing hemisphere. To enhance or maximize the collection and utilization of the primary emission and secondary emissions by that of the one or phosphorescent materials and one or more fluorescent materials, respectively, the composition of the present teachings may optionally be disposed onto a reflection layer that redirects at least a portion of radiation emitted in the composition towards the direction of the viewing hemisphere. In some instances, the reflection layer may additionally function as a substrate for the composition. The reflection layer may provide either specular reflection or diffuse reflection. A specular reflection layer may be prepared by any method well-known to those skilled in the art, such as alternately layering non-metallic materials with high and low dielectric constants, such as in the case of U.S. Pat. No. 7,459,204, which is incorporated by referenced herein in its entirety. A diffuse reflection layer may be fabricated by any method well-known to those skilled in the art, for example, as a film, coating or layer of materials, such as titanium oxide, silicon dioxide, etc., that scatter but do not absorb the wavelengths of interest.

In a further aspect, the low rare earth mineral photoluminescent composition may additionally comprise one or more UV absorbers to further enhance the stability of the one or more fluorescent materials through substantially absorbing at least a portion of incident ultraviolet electromagnetic radiation. It should be noted that it is preferred that the one or more UV absorbers being selected minimally interfere, if at all, with the charging of the one or more phosphorescent materials having substantially low rare earth mineral content, so as not to impede these one or more phosphorescent materials absorption capabilities of the incident electromagnetic radiation. Thus, the absorption spectrum of the one or more UV absorbers should preferentially have minimal, if any, overlap with that of the absorption spectrum of the one or more phosphorescent materials. This preference arises from the dependence of the secondary emission on that of at least a portion of the primary emission. Suitable UV absorbers useful in the present invention include, but are not limited to, organic light stabilizers such as benzophenones, benzotriazoles, and hydroxylphenyltriazines, and inorganic light stabilizers such as zinc oxide, titanium oxide, and cerium oxide.

In the instance where substantially longer emissive wavelengths of long-persistent luminescence are desired, e.g. orange or red, the low rare earth mineral photoluminescent composition may optionally be deposited onto a surface of one or more fluorescent layers that comprise one or more fluorescent materials. In one aspect, the surface of the one or more fluorescent layers is exposed to incident electromagnetic radiation. In this aspect the one or more fluorescent materials should be minimally susceptible to photolytic degradation and emit substantially longer wavelengths. In another aspect, the low rare earth mineral photoluminescent composition is exposed to incident electromagnetic radiation. In either aspect, the one or more fluorescent materials have an absorption spectrum that at least partially overlaps with the emission spectrum of the one or more phosphorescent materials.

Additional components may be added to the low rare earth mineral photoluminescent composition to facilitate the dissolution/dispersion and coating of the one or more phosphorescent materials and the one or more fluorescent materials, such as polymers, dispersants, wetting agents, defoamers, rheology modifiers, leveling agents, etc. Dispersants, wetting agents, defoamers, and leveling agents may each be oligomeric, polymeric, or copolymeric materials or blends containing surface-active (surfactant) characteristic blocks, such as, for example, polyethers, polyols, or polyacids. Examples of dispersants include acrylic acid-acrylamide polymers, or salts of amine functional compound and acid, hydroxyfunctional carboxylic acid esters with pigment affinity groups, and combinations thereof, for example DISPERBYK®-180, DISPERBYK®-181, DISPERBYK®-108, all from BYK-Chemie, and TEGO® Dispers 710 from Degussa GmbH. Wetting agents are surfactant materials, and may be selected from among polyether siloxane copolymers, for example, TEGO® Wet 270, non-ionic organic surfactants, for example, TEGO® Wet 500, and combinations thereof. Suitable rheology modifiers include polymeric urea urethanes and modified ureas, for example, BYK® 410 and BYK® 411 from BYK-Chemie®, and fumed silicas, such as CAB-O-SIL® M-5, CAB-0-SIL® EH-5, etc. Deaerators and defoamers may be organic modified polysiloxanes, for example, TEGO® Airex 900. Leveling agents may include polyacrylates, polysiloxanes, polyether siloxanes, etc. Quenchers of singlet molecular oxygen can also be added, such as 2,2,6,6-tetramethyl-4-piperidone and 1,4-diazabicyclo[2.2.2]octane.

The low rare earth mineral photoluminescent composition, according to the present invention, may be fabricated by any method well-known to those skilled in the art. The compositions may take the form of inks, paints, coatings fluids, etc., as well as contain the additional constituents necessary to facilitate the fabrication of such useful inks, paints, etc.

Low Rare Earth Mineral Photoluminescent Structure Embodiments:

In another aspect, the present teachings provide for a low rare earth mineral photoluminescent structure that comprises at least a phosphorescent layer that substantially converts at least a portion of incident electromagnetic radiation and one or more fluorescent layers having an absorption spectrum that overlaps with at least a portion of the emitted radiation from the phosphorescent layer, i.e. primary emission, to generate long-persistent luminescence. The phosphorescent layer comprises at least one or more phosphorescent materials having a low rare earth mineral content with an absorption spectrum that at least partially overlaps with incident electromagnetic radiation. Upon exposure to the incident electromagnetic radiation, the phosphorescent layer absorbs at least a portion of the incident electromagnetic radiation and substantially converts the absorbed radiation to a primary emission of a longer wavelength. At least a portion of the primary emission is then absorbed by the one or more fluorescent layers and substantially converted to a secondary emission of an even longer wavelength than that of the primary emission. Given that the one or more phosphorescent materials within the phosphorescent layer and the one or more fluorescent materials within the one or more fluorescent layers of the present teachings are characterized as isotropic Lambertian emitters, approximately 50% of unabsorbed primary emission and approximately 50% of secondary emission will propagate to the viewing hemisphere.

Figure 6:
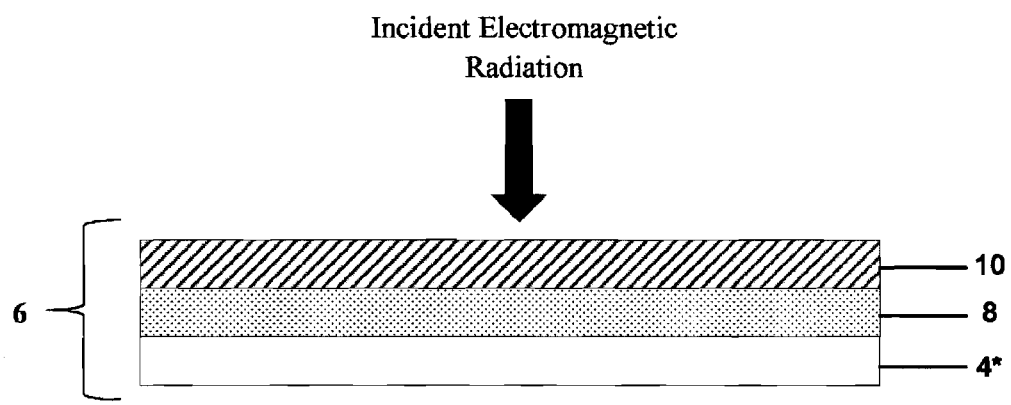
FIG. 6 is a schematic drawing of a low rare earth mineral structure according to one aspect of these teachings.
Figure 7:
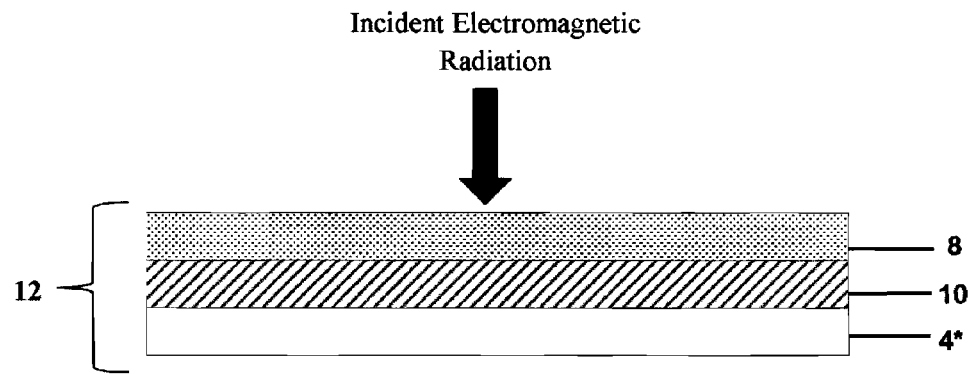
FIG. 7 is a schematic drawing of a low rare earth mineral structure according to a second aspect of these teachings.
Figure 8:
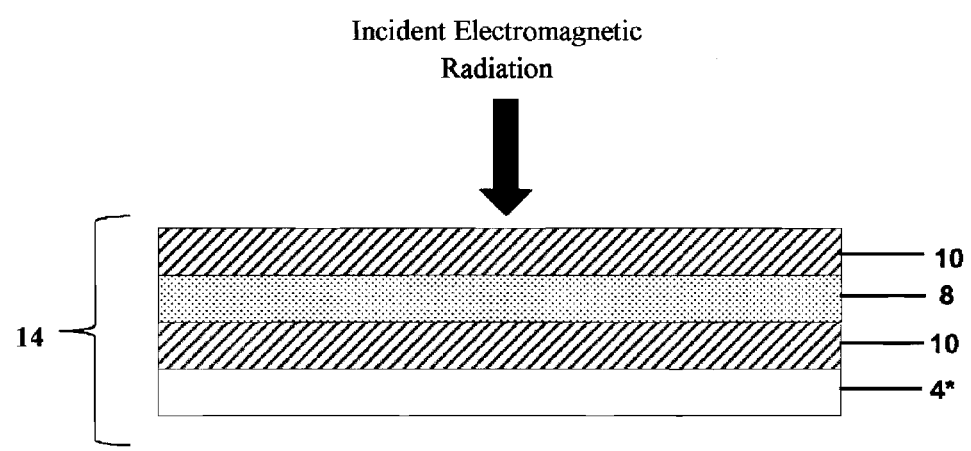
FIG. 8 is a schematic drawing of a low rare earth mineral structure according to another aspect of these teachings.

According to the present teachings, to optimize the primary and secondary emissions there are various potential layering arrangements that may exist within the low rare earth mineral photoluminescent structure. For example, FIG. 6 depicts one aspect of the present teachings, in which the one or more fluorescent layers 10 are disposed over the phosphorescent layer 8, such that a surface of the one or more fluorescent layers 10 is exposed to the incident electromagnetic radiation. Still referring to FIG. 6, this aspect is useful for generating longer wavelengths. FIG. 7 illustrates another aspect of the present teachings, in which the phosphorescent layer 8 is disposed over the one or more fluorescent layers 10, such that a surface of the phosphorescent layer 8 is exposed to the incident electromagnetic radiation. FIG. 8 is a further aspect of FIG. 7 in which another one or more fluorescent layers 10 are rendered over the phosphorescent layer 8 such that a surface of the another one or more fluorescent layers 10 is exposed to the incident electromagnetic radiation. It should be noted that, where the phosphorescent layer 8 is disposed over at least one of one or more fluorescent layers 10, as illustrated in FIGS. 7 and 8, the phosphorescent layer 8 may additionally provide at least one of mechanical, chemical, or photolytic stability to the underlying one or more fluorescent layers 10.

Referring to FIGS. 6, 7, and 8, the low rare earth mineral photoluminescent structures of the present teachings, in addition to the phosphorescent layer 8 and the one or more fluorescent layers 10, may optionally comprise a substrate 4* that provides base support to the structure. Suitable substrates useful in the present invention include, but are not limited to, polyesters, polyolefins, polycarbonates, and PVC films.

Figure 9:
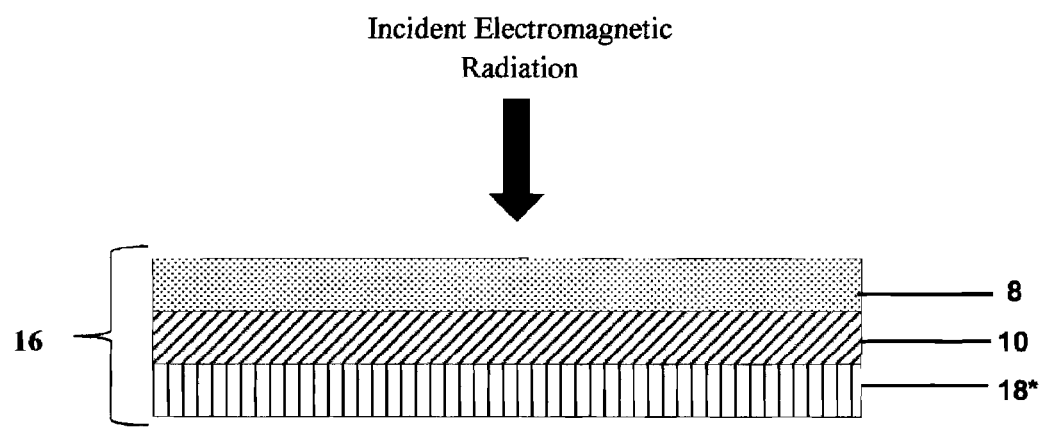
FIG. 9 is a schematic drawing of a low rare earth mineral structure according to further aspect of these teachings.

For the low rare earth mineral photoluminescent structure of the present teachings to efficiently generate long-persistent luminescent, the primary and secondary emission should substantially emit towards the forward propagating side of the structure, that is, toward the viewing hemisphere. To enhance or maximize the collection and utilization of the primary and secondary emissions in that of the phosphorescent layer and the one or more fluorescent layers, respectively, the structure 16, as depicted in FIG. 9, of the present teachings may optionally comprise a reflection layer 18* that redirects at least one of primary or secondary emission towards the forward propagating side of the structure 16, i.e. the side of the structure 16 that is directly exposed to the incident electromagnetic radiation. In some instances, the reflection layer 18* may additionally function as a substrate that provides base support to the structure 16, as well as additional embodiments according to the present teachings. The reflection layer may provide either specular reflection or diffuse reflection. A specular reflection layer may be prepared by any method well-known to those skilled the art, such as alternately layering non-metallic materials with high and low dielectric constants, such as in the case of U.S. Pat. No. 7,459,204, which is incorporated by referenced herein in its entirety. A diffuse reflection layer may be fabricated by any method well-known to those skilled in the art, for example, as a film, coating or layer of materials, such as titanium oxide, silicon dioxide, etc., that scatter but do not absorb the wavelengths of interest.

Figure 10:
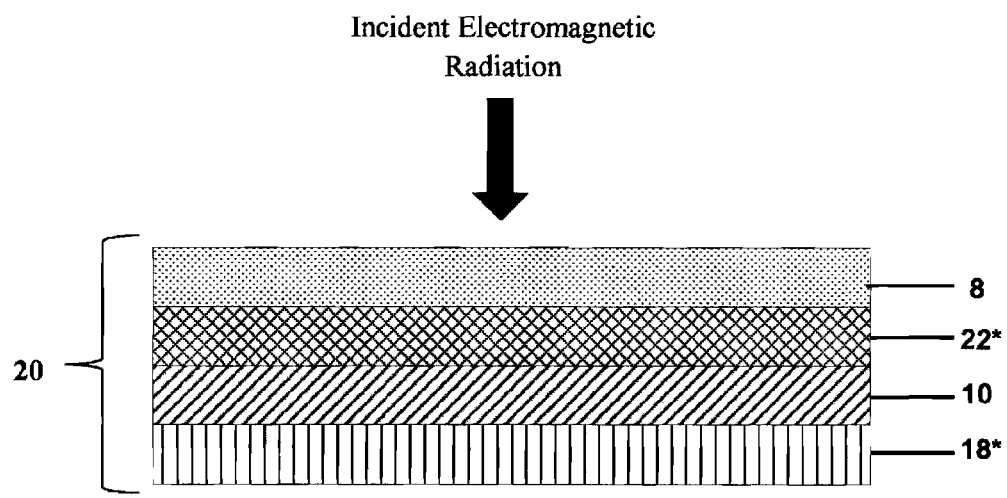
FIG. 10 is a schematic drawing of a low rare earth mineral structure according to another aspect of these teachings.

In a further aspect of the present teachings, UV absorbers may be rendered within the phosphorescent layer to enhance the stability of the one or more fluorescent layers through substantially absorbing at least a portion of incident ultraviolet electromagnetic radiation. Alternatively, as illustrated in FIG. 10, the UV absorbers may be rendered as a UV layer 22*, in which the UV layer 22* is deposited over a surface of one of the one or more fluorescent layers 10. In another aspect of the present teachings, the UV layer may be rendered onto a surface of the phosphorescent layer. It should be noted that it is preferred that the one or more UV absorbers being selected minimally interfere, if at all, with the charging of the one or more phosphorescent materials having substantially low rare earth mineral content, so as not to impede these one or more phosphorescent materials absorption capabilities of the incident electromagnetic radiation. Thus, the absorption spectrum of the one or more UV absorbers should preferentially have minimal, if any, overlap with that of the absorption spectrum of the one or more phosphorescent materials. This preference arises from the dependence of the secondary emission on that of at least a portion of the primary emission. Suitable UV absorbers useful in the present invention include, but are not limited to, organic light stabilizers such as benzophenones, benzotriazoles, and hydroxylphenyltriazines, and inorganic light stabilizers such as zinc oxide, titanium oxide, and cerium oxide.

In another aspect of the present teachings, the low rare earth mineral photoluminescent structure may further comprise a protective layer that provides at least one of mechanical, chemical, or photolytic durability to the structure by substantially shielding the structure from adverse environmental conditions. The protective layer is positioned over either the phosphorescent layer or one of the one or more fluorescent layers, such that a surface of the protective layer is exposed to incident electromagnetic radiation. Useful materials for the protective layer include, but are not limited to, poly(methylmethacrylate), polycarbonate, polyesters, polyurethanes, and PVC films.

Additional materials that may be included within the structure include, but are not limited to, polymeric resins, plasticizers, viscosity modifiers, dispersants, wetting agents, dearaters, defoamers, additional light stabilizers, antioxidants, and additional light scatterers. Polymeric resins that may be used in the structure include, but are not limited to, acrylates, polyurethanes, polyesters, polycarbonates, and polyvinyl chlorides. Plasticizers that may be used in the structure include, but are not limited, to polyesters, phthalates, trimellitates, adipates, and cyclohexane esters. Additional light stabilizers include, but are not limited, to hindered amine light stabilizers (HALS).

The low rare earth mineral photoluminescent structure, according to the present teachings, may be fabricated by any method well-known to those skilled in the art. For example, in one instance, the one or more fluorescent layers are coated on a substrate and the phosphorescent layer is subsequently disposed over the one or more fluorescent layers. In a further instance, another one or more fluorescent layers are then deposited over the phosphorescent layer. In yet another instance, the phosphorescent layer is deposited onto a substrate and the one or more fluorescent layers are then deposited over the phosphorescent layer. Such coating methods include, but are not limited to, painting, screen printing, spraying, slot coating, dip coating, roller coating, and bar coating. In addition, an effective low rare earth mineral photoluminescent structure may be prepared by methods that do not use a liquid carrier medium, such as, extrusion, injection molding, compression molding, calendaring, thermoforming, etc. Furthermore, the individual layers of the structure can be sequentially coated, or the individual layers can be separately prepared and later laminated or embossed together to form the structure.

According to the present teachings, the low rare earth mineral photoluminescent composition or structure may be utilized in a variety of applications in which long-persistent luminescent is sought. For example, the low rare earth mineral photoluminescent composition or structure may take the form of paints, tapes, inks, etc. in creating photoluminescent objects such as, but not limited to, road markings, safety markings, architectural glass blocks, textiles, shoes, sports equipment, putty, etc.

EXEMPLIFICATIONS

The present teachings, having been generally described, will be more readily understood by reference to the following examples, which are included merely for the purposes of illustration of certain aspects and embodiments of the present teachings, and are not intended to limit the scope of these teachings.

Example 1

Preparation of Low Rare Earth Mineral Photoluminescent Composition (Characterized as 2 in FIG. 5)

A formulation containing 100 parts of a commercial solvent-borne polyurethane, such as Mace resin 107-268, having 50% solids polyurethane in Toluene/Isopropanol, and 125 parts of a blue green long persistent phosphor, such as Performance Indicator PI-B20, was prepared and mixed at room temperature. To this solution was added 12.5 parts of a dye solution containing 0.1% Lumogen Yellow F083 in dioxolane and the mixture was stirred at room temperature until fully dissolved to yield a low rare earth mineral photoluminescent composition.

Example 2

Preparation of One or More Fluorescent Layers (Characterized as 10 in FIGS. 6-10)

A formulation containing 100 parts of an acrylic copolymer, such as Lucite Elvacite 2014, 65 parts toluene, 6.5 parts plasticizer, such as Plasthall P670, 0.9 parts wetting agent, such as Noresil S-900, 0.3 parts dye Lumogen Yellow F-083, 0.0375 parts dye Lumogen Yellow F-170, and 0.0375 parts dye solvent blue 38 was prepared and stirred at room temperature. The formulation was coated on release base at 10 mils or 250 microns wet thickness and dried at 35° C. for 4 hours and then at 80° C. for an additional 12 hours (for ensuring low residual solvent) to yield a 3 mil or 75 micron thick fluorescent layer.

Example 3

Preparation of Phosphorescent Layer (Characterized as 8 in FIGS. 6-10)

A formulation containing 100 parts of a commercial solvent polyurethane, such as Mace resin 107-268, having 50% solids polyurethane in Toluene/Isopropanol, and 125 parts of a blue green long persistent phosphor, such as Performance Indicator P1-B20, was prepared and mixed at room temperature. This formulation was then coated onto release base at 15 mils wet thickness and dried at 35° C. for 4 hours and then at 80° C. for an additional 12 hours to yield 5 mil thick phosphorescent layer.

Example 4

Preparation of Low Rare Earth Mineral Photoluminescent Structure (Characterized as 6 in FIG. 6)

Preparation of Fluorescent Layer: Prepared as in Example 2.
Preparation of Phosphorescent Layer: Prepared as in Example 3.
Preparation of Substrate: A 10 mil clear Mylar base, such as Dupont Melinex® 454.

The phosphorescent layer was removed from the release base and heat laminated onto the substrate, using a 27" roll laminator, such as Ledco Professor 27", at a temperature of 143.3° C. and a roller speed of 13 inches/minute. The fluorescent layer was removed from the release base and heat laminated onto the exposed surface of the laminated phosphorescent layer using a 27" roll laminator, such as Ledco Professor 27", at a temperature of 143.3° C. and a roller speed of 13 inches/minute to yield a low rare earth mineral photoluminescent structure comprising a substrate, a phosphorescent layer and a fluorescent layer.

Example 5

Preparation of Low Rare Earth Mineral Photoluminescent Structure (Characterized as 12 in FIG. 7)

Preparation of Fluorescent Layer: Prepared as in Example 2.
Preparation of Phosphorescent Layer: Prepared as in Example 3.
Preparation of Substrate: A 10 mil clear Mylar base, such as Dupont Melinex® 454

The fluorescent layer was removed from the release base and heat laminated onto the substrate, using a 27" roll laminator, such as Ledco Professor 27", at a temperature of 143.3° C. and a roller speed of 13 inches/minute. The phosphorescent layer was then removed from the release base and heat laminated onto the exposed surface of the laminated fluorescent layer using a 27" roll laminator, such as Ledco Professor 27", at a temperature of 143.3° C. and a roller speed of 13 inches/minute to yield a low rare earth mineral photoluminescent structure comprising a substrate, a fluorescent layer and a phosphorescent layer.

Example 6

Preparation of Low Rare Earth Mineral Photoluminescent Structure (Characterized as 14 in FIG. 8)

Preparation of First Fluorescent Layer: Prepared as in Example 2.
Preparation of Phosphorescent Layer: Prepared as in Example 3.
Preparation of Second Fluorescent Layer: Prepared as in Example 2.
Preparation of Substrate: A 10 mil clear Mylar base, such as Dupont Melinex® 454.

The first fluorescent layer was removed from the release base and heat laminated onto the substrate, using a 27" roll laminator, such as Ledco Professor 27", at a temperature of 143.3° C. and a roller speed of 13 inches/minute. The phosphorescent layer was then removed from the release base and heat laminated onto the exposed surface of the laminated first fluorescent layer using a 27" roll laminator, such as Ledco Professor 27", at a temperature of 143.3° C. and a roller speed of 13 inches/minute. The second fluorescent layer was removed from the release base and heat laminated onto the exposed surface of the laminated phosphorescent using a 27" roll laminator, such as Ledco Professor 27", at a temperature of 143.3° C. and a roller speed of 13 inches/minute to yield a low rare earth mineral photoluminescent structure comprising a substrate, one fluorescent layer, a phosphorescent layer, and another fluorescent layer.

Example 7

Preparation of Low Rare Earth Mineral Photoluminescent Structure (Characterized as 16 in FIG. 9)

Preparation of Fluorescent Layer: Prepared as in Example 2.
Preparation of Phosphorescent Layer: Prepared as in Example 3.
Preparation of Reflection Layer: A 10 mil white filled Mylar base, such as Dupont Melinex® 339.

The fluorescent layer was removed from the release base and heat laminated onto the reflection layer, using a 27" roll laminator, such as Ledco Professor 27", at a temperature of 143.3° C. and a roller speed of 13 inches/minute. The phosphorescent layer was then removed from the release base and heat laminated onto the exposed surface of the laminated fluorescent layer using a 27" roll laminator, such as Ledco Professor 27", at a temperature of 143.3° C. and a roller speed of 13 inches/minute to yield a low rare earth mineral photoluminescent structure comprising a reflection layer, a fluorescent layer and a phosphorescent layer.

Example 9

Preparation of Low Rare Earth Mineral Photoluminescent Structure (Characterized as 20 in FIG. 10)

Preparation of Fluorescent Layer: Prepared as in Example 2.
Preparation of Phosphorescent Layer: Prepared as in Example 3.
Preparation of Reflection Layer: A 10 mil white filled Mylar base, such as Dupont Melinex® 339.
Preparation of UV Layer: A formulation containing 100 parts of an acrylic copolymer, such as Lucite Elvacite 2014, 65 parts toluene, 6.5 parts plasticizer, such as Plasthall P670, 0.9 parts wetting agent, such as Noresil S-900, and 1 part UV absorber, such as Tinuvin 405, was prepared and stirred at room temperature. This formulation was then coated on release base at 10 mils or 250 microns wet thickness and dried at 35° C. for 4 hours and then at 80° C. for an additional 12 hours (for ensuring low residual solvent) to yield a 3 mil or 75 micron thick UV layer.

The fluorescent layer was removed from the release base and heat laminated onto the reflection layer, using a 27" roll laminator, such as Ledco Professor 27", at a temperature of 143.3° C. and a roller speed of 13 inches/minute. The UV layer was removed from the release base and heat laminated onto the exposed surface of the laminated fluorescent layer using a 27" roll laminator, such as Ledco Professor 27", at a temperature of 143.3° C. and a roller speed of 13 inches/minute. The phosphorescent layer was then removed from the release base and heat laminated onto the exposed surface of the laminated UV layer using a 27" roll laminator, such as Ledco Professor 27", at a temperature of 143.3° C. and a roller speed of 13 inches/minute to yield a low rare earth mineral photoluminescent structure comprising a reflection layer, a fluorescent layer, a UV layer and a phosphorescent layer.

For the purposes of describing and defining the present teachings, it is noted that the term "substantially" is utilized herein to represent the inherent degree of uncertainty that may be attributed to any quantitative comparison, value, measurement or other representation. The term "substantially" is also utilized herein to present the degree by which a quantitative representation may vary from a stated reference without resulting in a change in the basic function of the subject matter at issue.

Although the teachings have been described with respect to various aspects and embodiments, it should be realized that these teachings are also capable of a wide variety of further and other aspects and embodiments within the spirit and scope of the appended disclosure.

What is claimed is:

1. A low rare earth mineral photoluminescent structure for generating long-persistent luminescence, said low rare earth mineral photoluminescent structure comprising:
   a phosphorescent layer that substantially converts at least a portion of incident electromagnetic radiation to a primary emission, said phosphorescent layer comprising one or more phosphorescent materials having substantially low rare earth mineral content of less than about 2.0 weight percent with an absorption spectrum that at least partially overlaps with incident electromagnetic radiation, and
   one or more fluorescent layers that wholly or partially convert at least said primary emission to a secondary emission, said one or more fluorescent layers having an absorption spectrum that overlaps with at least a portion of said primary emission, and
   wherein said primary emission and said secondary emission being of long-persistent luminescence.

2. The low rare earth mineral photoluminescent structure of claim 1, wherein said phosphorescent layer further comprises one or more other phosphorescent materials having an absorption spectrum that at least partially overlaps with at least one of incident electromagnetic radiation, the emission spectrum of said one or more phosphorescent materials, or the secondary emission.

3. The low rare earth mineral photoluminescent structure of claim 2, wherein said one or more other phosphorescent materials having an emission spectrum that at least partially overlaps with the absorption spectrum of said one or more phosphorescent materials.

4. The low rare earth mineral photoluminescent structure of claim 1, wherein said phosphorescent layer being disposed over said one or more fluorescent layers, such that a surface of said phosphorescent layer is exposed to incident electromagnetic radiation.

5. The low rare earth mineral photoluminescent structure of claim 4, wherein another said one or more fluorescent layers being overlaid onto said phosphorescent layer, such that a surface of one of said another said one or more fluorescent layers is exposed to incident electromagnetic radiation.

6. The low rare earth mineral photoluminescent structure of claim 4, wherein said phosphorescent layer additionally provides at least one of mechanical, chemical, or photolytic stability to said one or more fluorescent layers.

7. The low rare earth mineral photoluminescent structure of claim 1, wherein said one or more fluorescent layers being disposed over said phosphorescent layer, such that a surface of one of said one or more fluorescent layers is exposed to incident electromagnetic radiation.

8. The low rare earth mineral photoluminescent structure of claim 1, further comprising a substrate that provides base support for said low rare earth mineral photoluminescent structure.

9. The low rare earth mineral photoluminescent structure of claim 1, further comprising a UV layer that substantially enhances stability of said one or more fluorescent layers through absorption of at least a portion of incident ultraviolet electromagnetic radiation.

10. The low rare earth mineral photoluminescent structure of claim 1, wherein said phosphorescent layer further comprises one or more UV absorbers that substantially enhance stability of said one or more fluorescent layers through absorption of at least a portion of incident ultraviolet electromagnetic radiation.

11. The low rare earth mineral photoluminescent structure of claim 1, further comprising a reflection layer that redirects at least a portion of radiation emitted in at least one of said phosphorescent layer or said one or more fluorescent layers.

12. The low rare earth mineral photoluminescent structure of claim 11, wherein said reflection layer additionally functions as a substrate that provides base support for said low rare earth mineral photoluminescent structure.

13. The low rare earth mineral photoluminescent structure of claim 1, further comprising a protective layer that provides at least one of mechanical, chemical, or photolytic durability to said low rare earth mineral photoluminescent structure.

14. A method for fabricating a low rare earth mineral photoluminescent structure for generating long-persistent luminescence, said method comprising:
   forming a phosphorescent layer that substantially converts at least a portion of incident electromagnetic radiation to a primary emission, said phosphorescent layer comprising one or more phosphorescent materials having substantially low rare earth mineral content of less than about 2.0 weight percent with an absorption spectrum that at least partially overlaps with incident electromagnetic radiation, and
   forming one or more fluorescent layers that wholly or partially convert at least said primary emission to a secondary emission, said one or more fluorescent layers having an absorption spectrum that overlaps with at least a portion of said primary emission, and
   wherein said primary emission and said secondary emission being of long-persistent luminescence.

15. The method of claim 14, wherein said phosphorescent layer further comprises one or more other phosphorescent materials having an absorption spectrum that at least partially overlaps with at least one of incident electromagnetic radiation, the emission spectrum of said one or more phosphorescent materials, or the secondary emission.

16. The method of claim 15, wherein said one or more other phosphorescent materials having an emission spectrum that at least partially overlaps with the absorption spectrum of said one or more phosphorescent materials.

17. The method of claim 14, further comprising disposing said phosphorescent layer over said one or more fluorescent layers, such that a surface of said phosphorescent layer is exposed to incident electromagnetic radiation.

18. The method of claim 17, further comprising overlaying another said one or more fluorescent layers onto said phosphorescent layer, such that a surface of one of said another said one or more fluorescent layers is exposed to incident electromagnetic radiation.

19. The method of claim 14, further comprising disposing said one or more fluorescent layers onto said phosphorescent layer, such that a surface of one of said one or more fluorescent layers is exposed to incident electromagnetic radiation.

20. The method of claim 14, further comprising rendering said phosphorescent layer or one of said one or more fluorescent layers onto or into a substrate that provides base support for said low rare earth mineral photoluminescent structure.

21. The method of claim 14, further comprising incorporating one or more UV absorbers into said phosphorescent layer, wherein said one or more UV absorbers substantially enhance stability of said one or more fluorescent layers through absorption of at least a portion of incident ultraviolet electromagnetic radiation.

22. The method of claim 14, further comprising overlaying a UV layer onto a surface of one of said phosphorescent layer or one of said one or more fluorescent layers, wherein said UV layer substantially enhances stability of said one or more fluorescent layers.

23. The method of claim 14, further comprising applying a reflection layer disposed over a surface of one of said phosphorescent layer or one of said one or more fluorescent layers, the surface not having another layer disposed on the surface, wherein said reflection layer redirects at least a portion of radiation emitted in at least one of said phosphorescent layer or said one or more fluorescent layers.

24. The method of claim 14, further comprising rendering a protective layer over a surface of one of said phosphorescent layer or one of said one or more fluorescent layers, the surface not having another layer disposed on the surface, wherein said protective layer provides at least one of mechanical, chemical, or photolytic durability to said low rare earth mineral photoluminescent structure.

25. A method for generating long-persistent luminescence, said method comprising:
   providing a low rare earth mineral photoluminescent structure, said low rare earth mineral photoluminescent structure comprising:
      (i) a phosphorescent layer comprising one or more phosphorescent materials having substantially low rare earth mineral content of less than about 2.0 weight percent with an absorption spectrum that at least partially overlaps with incident electromagnetic radiation, and
      (ii) one or more fluorescent layers having an absorption spectrum that overlaps with at least a portion of a primary emission, and
   wherein said low rare earth mineral photoluminescent structure is subsequently exposed to incident electromagnetic radiation and said phosphorescent layer substantially converts at least a portion of incident electromagnetic radiation to said primary emission, and said one or more fluorescent layers wholly or partially convert at least said primary emission to a secondary emission, and
   wherein said primary emission and said secondary emission being of long-persistent luminescence.

26. The method of claim 25, wherein said phosphorescent layer further comprises one or more other phosphorescent materials having an absorption spectrum that at least partially overlaps with at least one of incident electromagnetic radiation, the emission spectrum of said one or more phosphorescent materials, or the secondary emission.

27. The method of claim 26, wherein said one or more other phosphorescent materials having an emission spectrum that at least partially overlaps with the absorption spectrum of said one or more phosphorescent materials.

28. The method of claim 25, wherein said low rare earth mineral photoluminescent structure further comprises a substrate that provides base support for said low rare earth mineral photoluminescent structure.

29. The method of claim 25, wherein said phosphorescent layer further comprises one or more UV absorbers that substantially enhance stability of said one or more fluorescent layers through absorption of at least a portion of incident ultraviolet electromagnetic radiation.

30. The method of claim 25, wherein said low rare earth mineral photoluminescent structure further comprises a UV layer that substantially enhances stability of said one or more fluorescent layers through absorption of at least a portion of incident ultraviolet electromagnetic radiation.

31. The method of claim 25, wherein said low rare earth mineral photoluminescent structure further comprises a reflection layer that redirects at least a portion of radiation emitted in at least one of said phosphorescent layer or said one or more fluorescent layers.

32. The method of claim 25, wherein said low rare earth mineral photoluminescent structure further comprises a protective layer that provides at least one of mechanical, chemical, or photolytic durability to said low rare earth mineral photoluminescent structure.

33. A low rare earth mineral photoluminescent composition for generating long-persistent luminescence, said low rare earth mineral photoluminescent composition comprising:
   one or more phosphorescent materials that substantially convert at least a portion of incident electromagnetic radiation to a primary emission, said one or more phosphorescent materials having substantially low rare earth mineral content of less than about 2.0 weight percent with an absorption spectrum that at least partially overlaps with incident electromagnetic radiation, and
   one or more fluorescent materials that wholly or partially convert at least said primary emission to a secondary emission, said one or more fluorescent materials having an absorption spectrum that overlaps with at least a portion of said primary emission, and
   wherein said one or more phosphorescent materials substantially enhance stability of said one or more fluorescent materials, and
   wherein said primary emission and said secondary emission being of long-persistent luminescence.

34. The low rare earth mineral photoluminescent composition of claim 33, further comprising one or more other phosphorescent materials having an absorption spectrum that at least partially overlaps with at least one of incident electromagnetic radiation, the emission spectrum of said one or more phosphorescent materials, or the secondary emission.

35. The low rare earth mineral photoluminescent composition of claim 34, wherein said one or more other phosphorescent materials having an emission spectrum that at least partially overlaps with the absorption spectrum of said one or more phosphorescent materials.

36. The low rare earth mineral photoluminescent composition of claim 33, wherein said low rare earth mineral photoluminescent composition being disposed into or onto a substrate that provides base support for said low rare earth mineral photoluminescent composition.

37. The low rare earth mineral photoluminescent composition of claim 33, wherein said low rare earth mineral photoluminescent composition being disposed onto a reflection layer that redirects at least a portion of radiation emitted in said low rare earth mineral photoluminescent composition.

38. The low rare earth mineral photoluminescent composition of claim 37, wherein said reflection layer additionally functions as a substrate that provides base support for said low rare earth mineral photoluminescent composition.

39. The low rare earth mineral photoluminescent composition of claim 33, further comprising one or more UV absorbers that further substantially enhance stability of said one or more fluorescent materials through absorption of at least a portion of incident ultraviolet electromagnetic radiation.

40. The low rare earth mineral photoluminescent composition of claim 33, wherein said low rare earth mineral photoluminescent composition being disposed onto a surface of one or more fluorescent layers, such that a longer emissive wavelength is produced.

41. A method for fabricating a composition for generating long-persistent luminescence, said method comprising:

incorporating one or more phosphorescent materials having substantially low rare earth mineral content of less than about 2.0 weight percent with an absorption spectrum that at least partially overlaps with incident electromagnetic radiation, and one or more fluorescent materials having an absorption spectrum that overlaps with at least a portion of a primary emission into the composition, the composition being a low rare earth mineral photoluminescent composition, wherein said low rare earth mineral photoluminescent composition, when subsequently exposed to incident electromagnetic radiation, said one or more phosphorescent materials substantially convert at least a portion of incident electromagnetic radiation to said primary emission, and said one or more fluorescent materials wholly or partially convert at least said primary emission to a secondary emission, and wherein said one or more phosphorescent materials substantially enhance stability of said one or more fluorescent materials, and wherein said primary emission and said secondary emission being of long-persistent luminescence.

42. The method of claim 41, further comprising incorporating one or more other phosphorescent materials into the low rare earth mineral photoluminescent composition, wherein said one or more other phosphorescent materials having an absorption spectrum that at least partially overlaps with at least one of incident electromagnetic radiation, the emission spectrum of said one or more phosphorescent materials, or the secondary emission.

43. The method of claim 42, wherein said one or more other phosphorescent materials having an emission spectrum that at least partially overlaps with the absorption spectrum of said one or more phosphorescent materials.

44. The method of claim 41, further comprising depositing one or more UV absorbers into said low rare earth mineral photoluminescent composition, wherein said one or more UV absorbers further substantially enhance stability of said one or more fluorescent materials through absorption of at least a portion of incident ultraviolet electromagnetic radiation.

45. A method for generating long-persistent luminescence, said method comprising:
    providing a low rare earth mineral photoluminescent composition, said low rare earth mineral photoluminescent composition comprising:
    (i) one or more phosphorescent materials having substantially low rare earth mineral content of less than about 2.0 weight percent with an absorption spectrum that at least partially overlaps with incident electromagnetic radiation, and
    (ii) one or more fluorescent materials having an absorption spectrum that overlaps with at least a portion of a primary emission, and wherein said low rare earth mineral photoluminescent composition is subsequently exposed to incident electromagnetic radiation, and said one or more phosphorescent materials substantially convert at least a portion of incident electromagnetic radiation to said primary emission, and said one or more fluorescent materials wholly or partially convert at least said primary emission to a secondary emission, and wherein said one or more phosphorescent materials substantially enhance stability of said one or more fluorescent materials, and wherein said primary emission and said secondary emission being of long-persistent luminescence.

46. The method of claim 45, wherein said low rare earth mineral photoluminescent composition further comprises one or more other phosphorescent materials having an absorption spectrum that at least partially overlaps with at least one of incident electromagnetic radiation, the emission spectrum of said one or more phosphorescent materials, or the secondary emission.

47. The method of claim 46, wherein said one or more other phosphorescent materials having an emission spectrum that at least partially overlaps with the absorption spectrum of said one or more phosphorescent materials.

48. The method of claim 45, wherein said low rare earth mineral photoluminescent composition further comprises one or more UV absorbers that further substantially enhance stability of said one or more fluorescent materials through absorption of at least a portion of incident ultraviolet electromagnetic radiation.

49. The method of claim 45, further comprising depositing said low rare earth mineral photoluminescent composition onto or into a substrate that provides support for said low rare earth mineral photoluminescent composition.

50. The method of claim 45, further comprising depositing said low rare earth mineral photoluminescent composition onto a reflection layer that redirects at least a portion of radiation emitted in said low rare earth mineral photoluminescent composition.

51. The method of claim 45, further comprising depositing said low rare earth mineral photoluminescent composition onto a surface of one or more fluorescent layers, such that a longer emissive wavelength is produced.

* * * * *